United States Patent [19]
Bertolini et al.

[11] Patent Number: 5,453,678
[45] Date of Patent: Sep. 26, 1995

[54] PROGRAMMABLE-OUTPUT VOLTAGE REGULATOR

[75] Inventors: Luca Bertolini, Milan; Roberto Gariboldi, Lacchiarella, both of Italy

[73] Assignee: SGS-Thomson Microelectronics s.r.l., Via C. Olivetti, Italy

[21] Appl. No.: 83,721

[22] Filed: Jun. 24, 1993

[30] Foreign Application Priority Data

Jun. 25, 1992 [EP] European Pat. Off. .............. 92830331

[51] Int. Cl.⁶ .................................................... G05F 1/56
[52] U.S. Cl. ........................................... 323/282; 323/284
[58] Field of Search ................................... 323/282, 281, 323/908, 284, 299, 303, 273, 274, 349, 351; 361/18, 86, 88

[56] References Cited

U.S. PATENT DOCUMENTS

| | | | |
|---|---|---|---|
| 4,420,700 | 12/1983 | Fay et al. .............................. | 323/282 X |
| 4,442,397 | 4/1984 | Ishikawa et al. ......................... | 323/275 |
| 4,521,725 | 6/1985 | Phaneuf .................................... | 323/282 |
| 4,580,090 | 4/1986 | Bailey et al. ............................. | 323/303 |
| 4,731,574 | 3/1988 | Melbert .................................... | 323/275 |
| 4,733,159 | 3/1988 | Edwards et al. ......................... | 323/282 |
| 4,819,117 | 4/1989 | Brennan et al. ......................... | 361/18 |
| 4,952,864 | 8/1990 | Pless et al. ............................... | 323/299 |

FOREIGN PATENT DOCUMENTS

| | | | |
|---|---|---|---|
| 0103455 | 9/1983 | European Pat. Off. ........... | G05F/1/56 |
| 0421516A3 | 9/1990 | European Pat. Off. ......... | G05F/1/573 |
| 4034676A1 | 10/1990 | Germany ........................ | G06K/19/07 |

OTHER PUBLICATIONS

Von Mario Bollinger, "Integriertes Interface erleichtert Kontakt," No. 23, 60–62, Nov. 2, 1990.

*Primary Examiner*—Thomas M. Dougherty
*Assistant Examiner*—Adolf Berhane
*Attorney, Agent, or Firm*—David V. Carlson; Robert Iannucci; Seed and Berry

[57] ABSTRACT

A regulator including a power element between the input terminal and output terminal; and a regulating loop including a differential stage for comparing the output voltage of the regulator with a reference voltage and accordingly driving a gain stage connected to the power element. The output voltage is picked up by the differential stage via a resistive divider, the resistance of which varies according to the value of a logic signal at a control input. When the resistance of the divider changes, the inputs of the differential stage are so unbalanced as to produce an output voltage up or down ramp equal to the slew rate of the regulating loop and proportional to the bias current of the differential stage. Over the up ramp, the shorting protection circuit is turned off for a predetermined time τ, whereas, over the down ramp, a stage is turned on for absorbing the discharge current of the capacitive load.

22 Claims, 1 Drawing Sheet

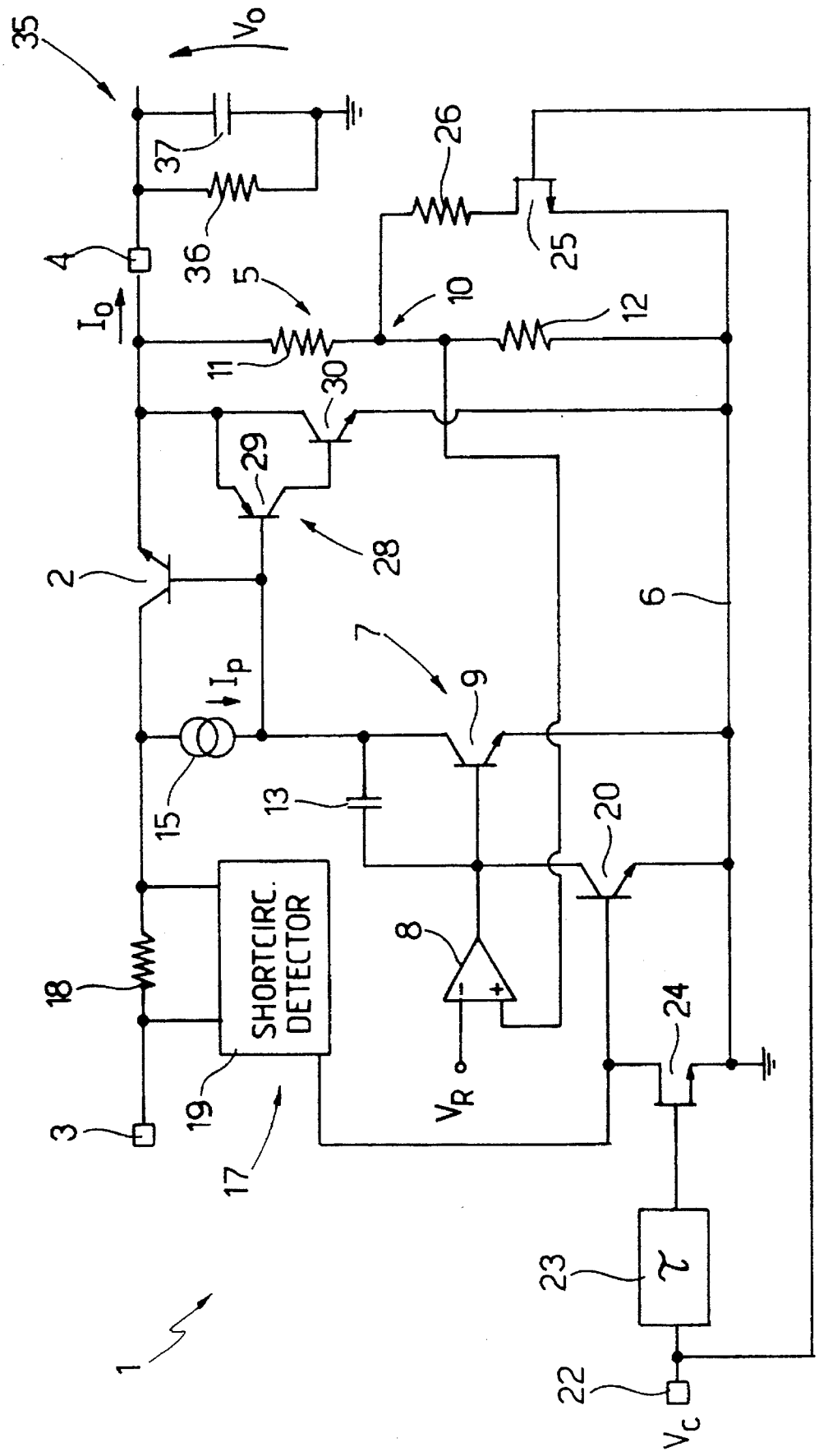

PROGRAMMABLE-OUTPUT VOLTAGE REGULATOR

TECHNICAL FIELD

The present invention relates to a programmable-output voltage regulator.

BACKGROUND OF THE INVENTION

Voltage regulators are devices for automatically regulating and maintaining output voltage within predetermined limits in spite of variations in quantities such as supply voltage and load current. For this purpose, known regulators roughly comprise a power element between the supply and load, and a regulating loop consisting of a differential amplifier input-connected to a stable reference voltage and to the regulator output, and output-connected to a gain stage for so driving the power element as to withstand any variation in output voltage. Known regulators frequently also present a shorting protection circuit for detecting the load current and intervening in the event this exceeds a predetermined value. The output voltage is normally picked up by the differential amplifier via a resistive divider.

Recently, a demand has arisen for what are known as "programmable-output" voltage regulators, that is, capable of providing for at least two different output values. These are particularly requested for so-called "smart cards," the standards governing which demand that the rate at which the output voltage varies during transient states falls within a predetermined range, regardless of the type of load or output voltage.

Such a condition is particularly hard to meet when the load is of a capacitive type, in which case, the regulator is called upon to supply a high current during transient states in which the output voltage increases from the steady-state to a higher value, and to absorb the load current during transient states in which the output voltage switches from the higher to a lower value, while at the same time ensuring the above condition is met.

Known voltage regulators fail to cater for the above requirements, owing to the fact that, at the beginning of the output voltage rising transient state, a short-circuit condition is produced by the output capacitor, thus resulting in undesired operation of the shorting protection circuit; whereas, during the output voltage decreasing transient state, voltage decreasing depends on the condition of the load, by virtue of the discharge current of the capacitor being absorbed by the resistive part of the load. In either case, therefore, the voltage variation caused by switching between two stable steady-state values is uncontrolled, and may assume levels that are unacceptable by present standards.

SUMMARY OF THE INVENTION

It is an object of the present invention to provide an externally-programmable-output voltage regulator capable of maintaining within predetermined limits the rate at which the output voltage varies during transient states between two steady-state values.

In short, according to the present invention, the rate at which the output voltage varies is controlled precisely, so as to assume a predetermined design value. Said rate preferably equals the slew rate of the regulating loop, which is achieved by unbalancing the differential stage. For preventing intervention of the shorting protection circuit, this is turned off for a predetermined length of time during the rising transient state, whereas, during the falling transient state, a PNP transistor stage is turned on for absorbing the discharge current of the capacitive load.

A preferred, non-limiting embodiment of the present invention will be described by way of example with reference to the accompanying drawing, which shows a simplified circuit diagram of the voltage regulator according to the present invention.

BRIEF DESCRIPTION OF THE DRAWING

FIG. 1 is a circuit diagram of a programmable-output voltage regulator according to the present invention.

DETAILED DESCRIPTION OF THE INVENTION

Number 1 in the accompanying drawing indicates a voltage regulator comprising, in known manner, an NPN-type transistor 2 defining a power element between input terminal 3 and output terminal 4 of the regulator; a resistive divider 5 between output terminal 4 and a ground (reference potential) line 6; and a regulating loop 7 including a differential amplifier 8 and an NPN type gain transistor 9.

More specifically, transistor 2 presents the collector terminal connected to input 3, the emitter terminal connected to output 4, and the base terminal connected to the collector of transistor 9, which in turn presents the emitter terminal connected to ground line 6, and the base terminal connected to the output of amplifier 8. Output terminal 4, at which an output voltage Vo is present, is connected to a load 35 here including a resistor 36 and a capacitor 37. Amplifier 8 presents an inverting input connected to a reference voltage source (not shown) supplying reference potential $V_R$ and a non-inverting input connected to node 10 defined by two resistors 11, 12 forming divider 5. A frequency compensating capacitor 13 is provided between the collector and base of transistor 9, and a current source 15 (generating current $I_p$) between the collector and base of transistor 2.

Regulator 1 also comprises, in known manner, a shorting protection circuit 17 in turn comprising a current sensor formed by a resistor 18 between input terminal 3 and the collector of transistor 2; a detecting stage 19 for detecting short circuiting on the basis of the voltage across resistor 18 (and therefore proportional to the current through resistor 18); and an actuating element formed by an NPN type transistor 20 with the base terminal connected to the output of detecting stage 19, the collector terminal connected to the output of amplifier 8, and the emitter terminal connected to ground line 6. Detecting stage 19 may operate, for example, as a straightforward comparator, for supplying an output control signal to transistor 20 when the voltage drop across the resistor, as determined by measuring the voltage at the two terminals of resistor 18 to determine if it exceeds a predetermined threshold.

Regulator 1 also comprises a further input terminal 22 supplied with a logic control signal $V_C$ the value of which depends on the (higher or lower) steady-state value of output voltage $V_o$. Terminal 22 is connected to the input of a delay circuit 23, which is activated in response to each leading edge of signal $V_C$, and supplies an output control pulse of duration τ to the gate terminal of a MOS transistor 24 defining a controlled switch and formed, for example, by a VDMOS (Vertical Diffused Metal Oxide Semiconductor). Duration τ is appropriately selected at the design stage, and substantially corresponds to the rise time (up ramp) of the transient output voltage. Transistor 24 is also connected by the drain terminal to the base of transistor 20, and by the source terminal to ground line 6.

Input terminal 22 is also connected to the gate terminal of a further MOS type transistor 25 defining a further controlled switch and having the source terminal connected to ground line 6, and the drain terminal connected to node 10 via resistor 26.

Regulator 1 also comprises an equivalent PNP transistor element 28 formed by a PNP transistor 29 and an NPN transistor 30. More specifically, transistor 29 presents the emitter terminal connected to output terminal 4, the base terminal connected to that of transistor 2, and the collector terminal connected to the base terminal of transistor 30, which in turn presents the collector terminal connected to output terminal 4, and the emitter terminal connected to ground line 6.

Regulator 1 of FIG. 1 operates as follows. When control signal $V_C$ presents a low logic level, transistor 25 remains off to give a regulated output voltage $V_{o1}$ of:

$$V_{o1}=V_R(1+R_1/R_2) \tag{1}$$

where $R_1$, $R_2$ are the respective resistances of resistors 11 and 12.

In the steady-state condition, equivalent transistor 28 is off; capacitor 37 is charged to voltage $V_{o1}$; differential amplifier 8 is balanced; regulator 1 supplies output current $I_o=V_{o1}/R_o$ where $R_o$ is the resistance of resistor 36; the output of delay circuit 23 is low; transistor 24 is off; and protection circuit 17 is on. Regulator 1 thus provides normally for maintaining a stable output voltage, by virtue of any change in $V_o$ resulting in a similar change in the voltage at node 10 and, consequently, in operation of regulating loop 7 (which increases or decreases the base current of transistor 2) so as to restore the output voltage to the programmed $V_{o1}$ value.

When signal $V_C$ switches from LOW to HIGH, this results in a transient output voltage to a higher value, and in temporary turn-off of protection circuit 17. That is, when $V_C$ switches to high, transistor 25 is turned on; resistor 26 is connected parallel to resistor 12 of divider 5; the resulting negative voltage peak at node 10 totally unbalances amplifier 8, thus reducing the output current of amplifier 8 and the current through transistor 9, and producing a corresponding increase in the drive current from source 15 to the base of transistor 2 and, consequently, in output current $I_o$; and output voltage $V_o$ increases until, by virtue of regulating loop 7, the voltage at node 10 is restored to $V_R$, amplifier 8 is again balanced, and the output voltage reaches the new steady-state value $V_{o2}$ of:

$$V_{o2}=V_R(1+R_1/R_p+R_1/R_2) \tag{2}$$

where $R_p$ is the resistance of resistor 26, and the saturation resistance of MOS transistor 25 is considered negligible in relation to $R_p$. Naturally, different $R_p$ values result in different output voltages.

At the same time, the rising edge of signal $V_C$ turns on delay circuit 23, the output of which switches to turn on MOS transistor 24; and transistor 24 short circuits the base-emitter junction of transistor 20, so that transistor 20 remains off regardless of the output of detecting circuit 19, and protection stage 17 is turned off.

In the above transient phase, the peak current supplied by the regulator shown may be even much higher than the steady-state value. In fact, in the case of a voltage regulator of the general type described, if SR is the slew rate obtainable; $\delta V_o/\delta t$ is the change in output voltage per unit of time; $I_{op}$ is the bias current of the differential stage; and C is the capacitance of capacitor 13:

$$SR=\max(\delta V_o/\delta t)=I_{op}/C \tag{3}$$

(see, for example, "Analysis and Design of Analog Integrated Circuits" by P. R. Gray and R. G. Meyer; John Wiley & Sons, 1977; page 541–544, Par. 9.6.1, where $I_x=I_{op}$.

Disregarding for the time being resistance $R_o$ of load resistor 36, if $C_o$ is the capacitance of load capacitor 37, the mean current $I_o$ supplied by regulator 1 to capacitor 36, for producing a voltage excursion $\delta V_o$ in relation to the steady-state value within a time interval $\delta t$, equals:

$$I_o=C_o*\delta V_o/\delta t \tag{4}$$

and the maximum current $I_{omax}$ equals:

$$I_{omax}=C_o*\max(\delta V_o/\delta t) \tag{5}$$

Substituting (3) in (5), this gives:

$$I_{omax}=C_o*I_{op}/C \tag{6}$$

and, bearing in mind also load resistor 36:

$$I_{omax}=C_o*I_{op}/C+V_o/R_o \tag{7}$$

For ensuring a predetermined voltage ramp, therefore, supply current $I_o$ may be even much higher than steady-state load current $V_o/R_o$. For example, assuming $C_o=1$ μF; C=20pF; $V_o=25$ V; $I_{op}=20$ μA; and $R_o=250$ Ω; the transient state current requirement ($C_oI_{op}/C=1$ A) is greater than the steady-state current (in this case, 0.1 A).

In the case of known regulators of the type described, output current is normally limited by the current gain of the output stage of the regulator (including transistor 2 and source 15) and by operation of protection circuit 17. More specifically, current supply depends substantially on the area of power transistor 2 and on the current $I_p$ supplied by source 15 for driving transistor 2, and as such may be modified at the design stage so that it is sufficiently high or at least greater than the maximum value achievable according to equation (7). The second limitation (operation of circuit 17) is normally dictated at the design stage by thermal and/or reliability factors, and as such can only be modified at the expense of endangering the reliability of the regulator. As already stated, therefore, according to the present invention, circuit 17 is turned off over the up ramp of the output voltage, thus preventing current supply from being limited by the protection circuit, and so enabling it to reach the maximum value achievable on the basis of current $I_p$.

Over the up ramp, therefore, the load is supplied with current the value of which is so controlled as to produce an increase in voltage regardless of the load and equal to the slew rate of the regulator, i.e., $I_{op}/C$.

When signal $V_C$ switches from HIGH to LOW, this again unbalances amplifier 8, and produces a transient state wherein output voltage $V_o$ switches from $V_{o2}$ to $V_{o1}$. That is, when signal $V_C$ switches to low, MOS transistor 25 is turned off so that resistor 26 is no longer connected in parallel to resistor 12; the resistance between node 10 and ground increases to produce a positive voltage peak at node 10; the non-inverting input of amplifier 8 presents a more positive potential as compared with the inverting input; the drive current of transistor 9 increases, so that transistor 9 absorbs all of source current I and turns off power transistor 2; and capacitor 37 begins discharging into the load (resistor 36).

At this phase, the collector voltage of transistor 9 is reduced, and, by virtue of this occurring faster than the change in output voltage (and consequently in the emitter voltage of transistor 2), equivalent PNP transistor 28 is eventually turned on, so as to absorb the load current and enable discharge at a rate independent of resistor 36. More specifically, the down ramp of the output voltage is limited solely by the bias current of amplifier 8, and equals the slew rate, again equal to $I_{op}/C$. For preventing speed from being limited over the down ramp, the equivalent PNP transistor 10 must obviously also be so designed as to guarantee a maximum current as per equation (7).

In this phase, the delay circuit remains inoperative, by virtue of the output current being inverted and so failing anyway to turn on protection circuit 17.

The advantages of the regulator according to the present invention will be clear from the foregoing description. Firstly, both the up and down ramps are accurately controllable regardless of the load connected to the output, by virtue of the quantities by which the ramp is defined (i.e., the bias current of the differential stage and the capacitance of the compensating capacitor) being appropriately selectable at the design stage and producible to a high degree of accuracy. Secondly, such sizing provides for obtaining symmetrical up and down ramps using components of limited area, even in the case of equivalent transistor 28, by virtue of the configuration shown enabling the same maximum current to be obtained with a smaller area as compared with the area required by a single PNP type transistor.

Finally, the solution described is straightforward in design, and provides for trouble-free implementation, in both discrete and integrated manner, using proved manufacturing techniques.

To those skilled in the art it will be clear that changes may be made to the regulator as described and illustrated herein without, however, departing from the scope of the present invention. For example, the change in output voltage may be achieved differently; equivalent transistor 28 may consist of a single device; and, if symmetrical up and down ramps are not required, current supply over the down ramp may be limited by appropriately sizing equivalent transistor 28.

We claim:

1. A programmable-output voltage regulator comprising:
   an input terminal;
   an output terminal set at an output potential;
   a power element located between the input and output terminals and having a drive terminal;
   a regulating loop including a differential stage and a gain stage, the differential stage having an output and two inputs connected respectively to the output terminal and to a reference potential; and the gain stage being located between the output of the differential stage and the drive terminal of the power element; and
   control means for changing the output potential from a first programmed value to a second programmed value and for controlling the rate of change of the output potential from the first programmed value to the second programmed value at a predetermined first change rate.

2. A regulator as claimed in claim 1 wherein the differential stage presents a bias current and the control means comprises unbalancing means for so unbalancing the differential stage that the predetermined rate is proportional to the bias current of the differential stage.

3. A regulator as claimed in claim 2 wherein the unbalancing means comprises a resistive divider located between the output terminal and a reference potential line, and having a node connected to an input of the differential stage and having a resistance varying between at least a first and second value; and means for controlling the variation in resistance of the resistive divider.

4. A regulator as claimed in claim 3 wherein the resistive divider comprises a first and second resistive element series connected to each other, the first resistive element being connected to the output terminal and the control means comprises a third resistive element and a controlled switch series connected to each other and parallel connected to the second resistive element.

5. A regulator as claimed in claim 4 wherein the controlled switch comprises a MOS transistor having a control terminal connected to a control input of the regulator supplied with a logic control signal.

6. A regulator as claimed in claim 1 comprising:
   a shorting protection circuit including an actuating element having a control electrode and located between the output of the differential stage and a reference potential line and a disabling means output-connected to the control electrode of the actuating element of the protection circuit; the disabling means coupled to a control input of the control means, and generating a disabling output signal that disables the shorting protection circuit while the control means switches the output potential from the first programmed value to the second programmed value.

7. A regulator as claimed in claim 6 wherein the control input is supplied with a logic control signal designated to assume either of two logic values corresponding to the first and the second values of the output potential and the disabling means comprises a delay element having an input connected to the control input and an output connected to a control input of a second controlled switch located between the control electrode of the actuating element and the reference potential line such that the disabling means generates the disabling output signal for a delay period set by the delay element.

8. A regulator as claimed in claim 7 wherein the second controlled switch comprises a MOS transistor.

9. A programmable-output voltage regulator, comprising:
   an input terminal;
   an output terminal having an output potential;
   a power element located between the input and output terminals and having a drive terminal;
   a regulating loop including a differential stage and a gain stage, the differential stage having an output that provides a bias current and two inputs connected respectively to the output terminal and to differential stage input terminal circuit that is held at a reference potential, the gain stage being located between the output of the differential stage and the drive terminal of the power element; and
   a control circuit coupled to the output potential, the control circuit unbalancing the differential stage so that the output potential changes from a first programmed potential value to a second programmed potential value, the control circuit also controlling the rate of change of the output potential from the first programmed potential value to the second programmed potential value at a predetermined rate proportional to the bias current of the differential stage.

10. A regulator as claimed in claim 9 wherein the control means includes:
    a resistive divider having a resistance varying between at least a first and second value; means for controlling the variation in resistance of the resistive divider, the resistive divider being located between the output terminal and a reference potential line; and having a node connected to an input of the differential stage.

11. A regulator as claimed in claim 10 wherein the resistive divider includes first and second resistive elements series connected to each other, the first resistive element being connected to the output; and the control means further includes a third resistive element and a controlled switch series connected to each other and parallel connected to the second resistive element.

12. A regulator as claimed in claim 11 wherein the controlled switch includes a MOS transistor having a control terminal connected to a control input of the regulator supplied with a logic control signal.

13. A regulator as claimed in claim 1 wherein the control means controls the first change rate in the output potential at a linear rate from the first programmed value to the second programmed value.

14. A regulator as claimed in claim 1 wherein the control means controls a second change rate in the output potential from the second programmed value to the first programmed value.

15. A regulator as claimed in claim 14 wherein the control means control the second change rate to substantially equal the first change rate except for a change in sign of the second change rate with respect to the first change rate.

16. A voltage regulation method for controlling an output potential at an output terminal of a voltage regulator circuit, wherein the voltage regulator circuit includes a shortage protection circuit, the method comprising:

regulating the output potential about a first programmed value;

changing the output potential from the first programmed value to a second programmed value;

disabling the shorting protection circuit while the output potential is changing from the first programmed value to the second programmed value;

controlling a first change rate at which the output potential changes from the first programmed value to the second programmed value; and regulating the output potential about the second programmed value.

17. A voltage regulation method for controlling an output potential at an output terminal of a voltage regulator circuit, comprising:

regulating the output potential about a first programmed value;

changing the output potential from the first programmed value to a second programmed value;

controlling a first change rate at which the output potential changes from the first programmed value to the second programmed value, wherein the controlling step includes controlling the first change rate in the output potential at a linear rate from the first programmed value to the second programmed value; and regulating the output potential about the second programmed value.

18. A voltage regulation method for controlling an output potential at an output terminal of a voltage regulator circuit, comprising:

regulating the output potential about a first programmed value:

changing the output potential from the first programmed value to a second programmed value;

controlling a first change rate at which the output potential changes from the first programmed value to the second programmed value, wherein the controlling step includes controlling a second change rate in the output potential from the second programmed value to the first programmed value; and regulating the output potential about the second programmed value.

19. The voltage regulation method of claim 18 wherein the controlling step includes controlling the second change rate to substantially equal the first change rate except for a change in sign of the second rate with respect to the first change rate.

20. A programmable-output voltage regulator comprising:

an input terminal;

an output terminal set at an output potential;

a power element located between the input and output terminals and having a drive terminal;

a regulating loop including a differential stage and a gain stage, the differential stage having an output and two inputs connected respectively to the output terminal and to a reference potential; and the gain stage being located between the output of the differential stage and the drive terminal of the power element;

control means for controlling a first change rate in the output potential from a first programmed value to a second programmed value; and a current-absorbing element located between the output terminal and a reference potential line; the current-absorbing element having a control terminal connected to the gain stage, and providing for controlled current absorption when the control means switches the output potential from the second programmed value to the first programmed value.

21. A regulator as claimed in claim 20 wherein the current-absorbing element comprises an equivalent PNP transistor element having an equivalent emitter terminal connected to the output terminal, an equivalent base terminal connected to the drive terminal of the power element, and an equivalent collector terminal connected to the reference potential line.

22. A regulator and claimed in claim 21 wherein the equivalent PNP transistor element comprises a PNP transistor and an PNP transistor, the PNP transistor having a emitter terminal connected to the output terminal, a base terminal connected to the drive terminal of the power element, and a collector terminal connected to the base terminal of the NPN transistor, the NPN transistor also having a collector terminal connected to the output terminal, and an emitter terminal connected to the reference potential line.

* * * * *

UNITED STATES PATENT AND TRADEMARK OFFICE
CERTIFICATE OF CORRECTION

PATENT NO. : 5,453,678
DATED : September 26, 1995
INVENTOR(S) : Bertolini, et. al.

It is certified that error appears in the above-indentified patent and that said Letters Patent is hereby corrected as shown below:

In column 7, claim 15, line 27, please delete "control" and insert therefor --controls--.

In column 8, claim 22, line 52, please delete "and" and insert therefor-- as --.

In column 8, claim 22, line 54, after "an" and before "transistor", please delete "PNP" and insert therefor --NPN--.

In column 8, claim 22, line 54, after "having" and before "emitter", please delete "a" and insert therefor --an--.

Signed and Sealed this

Thirtieth Day of January, 1996

Attest:

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 5,453,678
DATED : September 26, 1995
INVENTOR(S) : Bertolini et al.

It is certified that error appears in the above-indentified patent and that said Letters Patent is hereby corrected as shown below:

On the title page, item [73], assignee, delete "Via C. Olivetti" and insert therefor --Milan--.

Signed and Sealed this

Second Day of April, 1996

Attest:

BRUCE LEHMAN

Attesting Officer     Commissioner of Patents and Trademarks